(12) United States Patent
Kawaguchi et al.

(10) Patent No.: US 8,134,675 B2
(45) Date of Patent: Mar. 13, 2012

(54) LIQUID CRYSTAL DISPLAY DEVICE

(75) Inventors: Takafumi Kawaguchi, Osaka (JP);
Takahiro Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 11/915,435

(22) PCT Filed: May 1, 2006

(86) PCT No.: PCT/JP2006/309095
§ 371 (c)(1),
(2), (4) Date: Jun. 8, 2010

(87) PCT Pub. No.: WO2006/126376
PCT Pub. Date: Nov. 30, 2006

(65) Prior Publication Data
US 2010/0265425 A1    Oct. 21, 2010

(30) Foreign Application Priority Data
May 24, 2005  (JP) ................. 2005-150774

(51) Int. Cl.
*G02F 1/1345* (2006.01)
*G02F 1/1333* (2006.01)
*G02F 1/1335* (2006.01)

(52) U.S. Cl. .................. 349/149; 349/58; 349/62

(58) Field of Classification Search .......... 349/58–65, 349/149–152
See application file for complete search history.

(56) References Cited

U.S. PATENT DOCUMENTS

| | | | | |
|---|---|---|---|---|
| 5,729,310 A * | 3/1998 | Horiuchi et al. | ................ | 349/62 |
| 6,055,029 A * | 4/2000 | Kurihara et al. | ................ | 349/65 |
| 6,452,649 B1 * | 9/2002 | Ono et al. | ................ | 349/61 |
| 6,961,103 B2 * | 11/2005 | Sung et al. | ................ | 349/58 |
| 7,312,837 B2 * | 12/2007 | Kim et al. | ................ | 349/12 |
| 7,609,334 B2 * | 10/2009 | Lee | ................ | 349/58 |
| 2002/0109803 A1 * | 8/2002 | Yu et al. | ................ | 349/58 |

FOREIGN PATENT DOCUMENTS

| | | | |
|---|---|---|---|
| JP | 2000-131692 A | 5/2000 | |
| JP | 2005-049450 A | 2/2005 | |

OTHER PUBLICATIONS

Official communication issued in the International Application No. PCT/JP2006/309095, mailed on Aug. 1, 2006.

* cited by examiner

*Primary Examiner* — Dung T. Nguyen
(74) *Attorney, Agent, or Firm* — Keating & Bennett, LLP

(57) ABSTRACT

A liquid crystal display device includes at least: a liquid crystal display panel; a light source provided on a back side of the liquid crystal display panel; and a frame accommodating the liquid crystal display panel and the light source and having an upper opening and a lower opening in an upper portion and a lower portion of the frame, respectively. The liquid crystal display panel includes a TFT substrate provided on a side of the light source, a CF substrate, a liquid crystal layer interposed between the TFT substrate and the CF substrate, a thin film driving circuit formed on the TFT substrate for driving the liquid crystal layer, and a front polarizing plate provided on a front surface of the CF substrate and having an overhanging portion overhanging from a periphery of the CF substrate. The front polarizing plate covers the upper opening of the frame and the overhanging portion is fixed to an upper end surface of the frame.

3 Claims, 1 Drawing Sheet

LIQUID CRYSTAL DISPLAY DEVICE

BACKGROUND OF THE INVENTION

1. Field of the Invention

The present invention relates to a liquid crystal display device including at least a liquid crystal display panel, a light source provided on the back side of the liquid crystal display panel, and a frame accommodating the liquid crystal display panel and the light source.

2. Description of the Related Art

Japanese Patent Laid-Open Publication No. 2005-49450 discloses a fixed structure of a liquid crystal display panel and a backlight unit. This fixed structure is characterized in that a polarizing plate attached to a viewing side of the liquid crystal display panel is larger than the outer size of a glass substrate of the liquid crystal display panel and an overhanging portion of the polarizing plate which overhangs from the glass substrate is bonded to an upper end of a frame to fix the liquid crystal display panel and the backlight unit. This fixed structure narrows the frame and improves impact resistance.

In the fixed structure of Japanese Patent Laid-Open Publication No. 2005-49450, however, as shown in FIG. 2 of Japanese Patent Laid-Open Publication No. 2005-49450, a driver IC chip is mounted on the back surface of a second substrate 5 provided on the viewing side (see paragraph [0017] of Japanese Patent Laid-Open Publication No. 2005-49450) and a protruding portion 5a is exposed. Therefore, light entering from outside to the protruding portion 5a may cause malfunction of the driver IC. In order to prevent light leakage from outside, it is necessary to attach a very expensive light-shielding tape or light-shielding sheet to the protruding portion 5a, resulting in high cost.

Moreover, the driver IC chip mounted on the back surface of the second substrate 5 is thicker than a first substrate 4. Therefore, a backlight unit 3 has an increased thickness in order to assure space for the driver IC chip.

An FPC (Flexible Printed Circuit) is thermocompression-bonded to the second substrate 5 with an anisotropic conductive film (ACF) and the FPC is exposed. Therefore, during handling of the FPC or the like, stress is applied to the thermocompression-bonded portion and the FPC may be separated. Therefore, extreme care is required to be taken when handling and the yield is not good. Moreover, the separated FPC needs reworking, increasing the number of steps.

SUMMARY OF THE INVENTION

In order to overcome the problems described above, preferred embodiments of the present invention to provide a liquid crystal display device that achieves cost reduction, a reduction in the device thickness, and prevents separation of an input substrate such as an FPC.

A preferred embodiment of the present invention provides a liquid crystal display device including at least: a liquid crystal display panel; a light source provided on a back side of the liquid crystal display panel; and a frame accommodating the liquid crystal display panel and the light source. The liquid crystal display panel includes a first substrate provided on a side of the light source, a second substrate facing the first substrate, a liquid crystal layer interposed between the first substrate and the second substrate, a thin film driving circuit formed on the first substrate for driving the liquid crystal layer, and an optical function sheet provided on a front surface of the second substrate and having an overhanging portion overhanging from a periphery of the second substrate. The optical function sheet covers an upper opening of the frame and the overhanging portion is fixed to an upper end surface of the frame.

Typically, the thin film driving circuit is a full monolithic integrated driving circuit and is formed on the first substrate by a photolithography method or the like. The optical function sheet is a planar member provided outside the substrate for affecting light. Examples of the optical function sheet include a polarizing plate and a phase difference plate.

The light source may include a light guide plate for emitting light toward the liquid crystal display panel, and a reflection sheet provided on a back surface of the light guide plate and having an overhanging portion overhanging from a periphery of the light guide plate. In this case, the reflection sheet preferably covers a lower opening of the frame and the overhanging portion of the reflection sheet is preferably fixed to a lower end surface of the frame.

The liquid crystal display device may further include an input substrate connected to the first substrate for applying a signal from outside to the thin film driving circuit. In this case, a portion of the input substrate is preferably interposed between the upper end surface of the frame and the overhanging portion of the optical function sheet. Examples of the input substrate include an interface such as an FPC and a heat connector.

According to various preferred embodiments of the present invention, the manufacturing cost of a liquid crystal display device can be reduced. Moreover, the thickness of the liquid crystal display device can be reduced. Moreover, separation of an input substrate such as an FPC in the liquid crystal display device can be prevented.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. It should be noted that, in the following preferred embodiments, a TFT (thin film transistor) liquid crystal display device will be described as an example of the invention.

Figure 1:
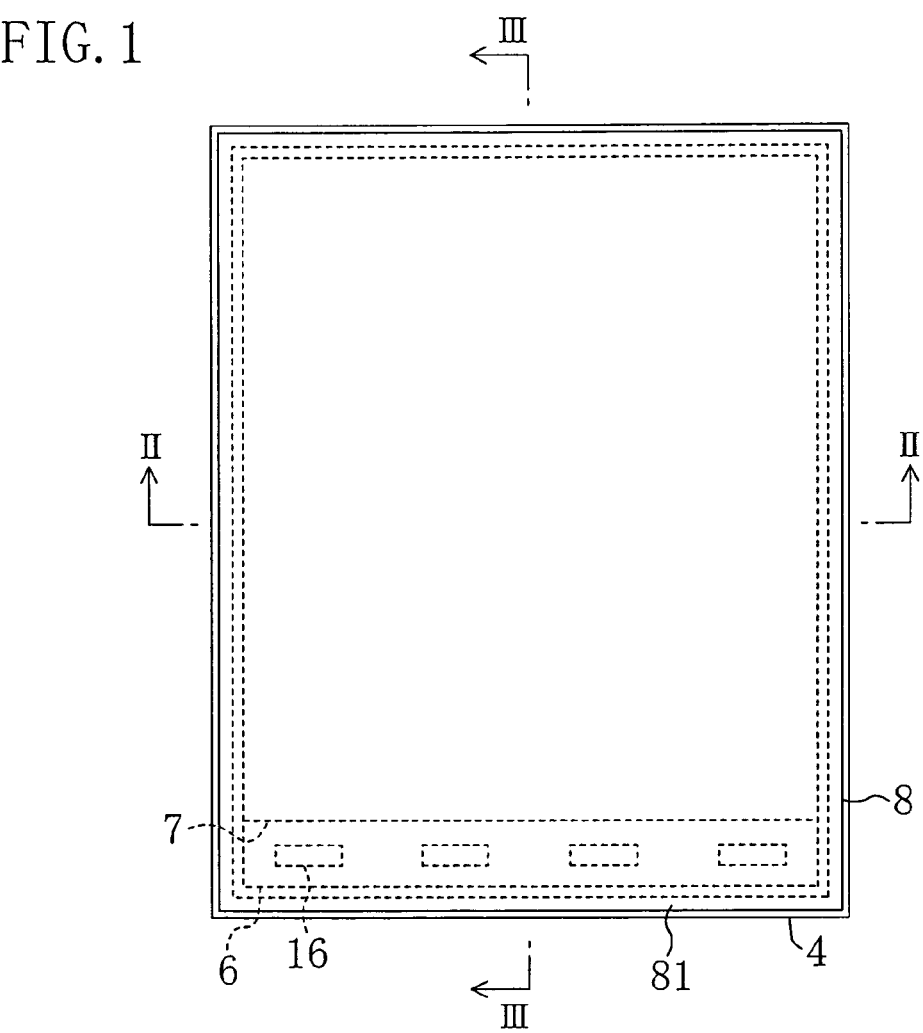
FIG. 1 is a schematic plan view of a liquid crystal display device according to a preferred embodiment of the present invention.
Figure 2:
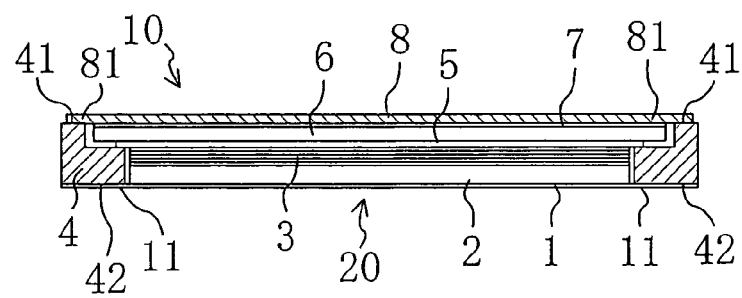
FIG. 2 is a cross-sectional view taken along line II-II in FIG. 1.
Figure 3:
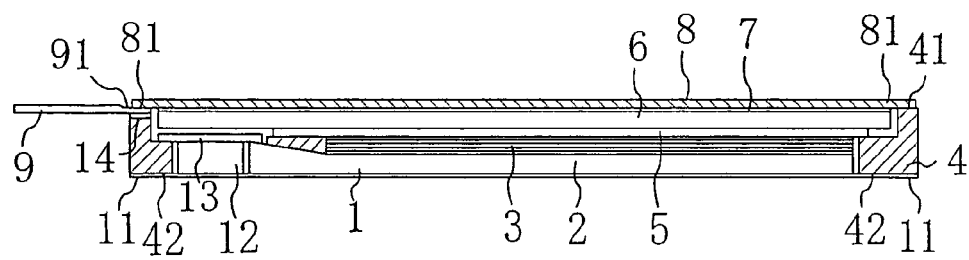
FIG. 3 is a cross-sectional view taken along line III-III in FIG. 1.

FIG. 1 is a schematic plan view of a liquid crystal display device of a preferred embodiment of the present invention. FIG. 2 is a cross-sectional view taken along line II-II in FIG. 1. FIG. 3 is a cross-sectional view taken along line III-III in FIG. 1. The liquid crystal display device of the present preferred embodiment includes a liquid crystal display panel 10, a light source 20 provided on the back side of the liquid crystal display panel 10 (on the side opposite to the viewer side), and a frame 4 accommodating the liquid crystal display panel 10 and the light source 20.

The liquid crystal display panel 10 includes a color filter glass substrate (hereinafter, referred to as CF substrate) 7 provided on the opposite side to the light source 20, a TFT glass substrate (hereinafter, referred to as TFT substrate) 6 facing the CF substrate 7, a liquid crystal layer (not shown) interposed between the CF substrate 7 and the TFT substrate 6, and a thin film driving circuit 16 formed on the TFT substrate 6 for driving the liquid crystal layer. A front polarizing plate 8 and a rear polarizing plate 5 are provided on the front surface of the CF substrate 7 and the back surface of the TFT substrate 6, respectively. A terminal portion (not shown) is provided in the periphery of the TFT substrate 6 and an FPC 9 is thermocompression-bonded to the terminal portion with an ACF.

A plurality of pixel electrodes (not shown) are arranged in a matrix on the TFT substrate 6 and a common electrode (not shown) is formed on the CF substrate 7. The plurality of pixel electrodes arranged in a matrix are respectively connected to TFTs (not shown) for controlling voltage application. Source lines and gate lines connected to the TFTs extend to a peripheral region of the TFT substrate 6 and are connected to the thin film driving circuit 16. When a signal is applied from outside to the thin film driving circuit 16 through the FPC 9, the thin film driving circuit 16 outputs a TFT driving signal to control voltage application to the plurality of pixel electrodes arranged in a matrix. A transmittance of the liquid crystal layer is thus controlled on a pixel by pixel basis and gray-scale display is provided.

The light source 20 includes a light guide plate 2 for emitting light toward the liquid crystal display panel 10, an LED (light emitting diode) 12 provided on an end surface of the light guide plate 2, an FPC 13 on which the LED 12 is mounted, a lens sheet and the like (such as a diffusing sheet and a lens sheet) 3 provided on the front surface of the light guide plate 2, and a reflection sheet 1 provided on the back surface of the light guide plate 2.

The frame 4 is shaped to surround the liquid crystal display panel 10 and the light source 20. The frame 4 has an upper opening and a lower opening in its upper portion and lower portion, respectively. An upper end surface 41 of the frame 4 is approximately flush with the front surface of the CF substrate 7 of the liquid crystal display panel 10. A recess for allowing the FPC 9 to extend to the outside is provided at the upper end surface 41 of one sidewall of the frame 4.

The front polarizing plate 8 has an overhanging portion 81 overhanging from the periphery (four sides) of the CF substrate 7. In other words, the front polarizing plate 8 is larger than the CF substrate 7 and laterally overhangs from the four sides of the CF substrate 7 when viewed two-dimensionally. The overhanging portion 81 of the front polarizing plate 8 is fixed to the upper end surface 41 of the frame 4. The upper opening of the frame 4 is thus closed by the front polarizing plate 8.

In a conventional liquid crystal display device in which a frame and a liquid crystal display panel are fixed with a double sided tape (light-shielding type), light leakage may occur from a portion that is not covered by the light-shielding double sided tape, such as a portion outside the light-shielding double sided tape (a portion outside a black mask) and a gap between the frame and the liquid crystal display panel.

In this preferred embodiment, the front polarizing plate 8 closes the upper opening of the frame 4. A polarizing plate allows only a portion of incident light, i.e., only light that vibrates in a prescribed direction, to transmit therethrough. In other words, the polarizing plate has a function to reduce the quantity of incident light. The front polarizing plate 8 closing the upper opening of the frame 4 thus reduces the quantity of light entering from outside to the thin film driving circuit 9 of the TFT substrate 6 and malfunction of the thin film driving circuit 16 can be prevented. Therefore, expensive light-shielding tape and light-shielding sheet for shielding the thin film driving circuit 16 from light are not necessary.

According to this preferred embodiment, the overhanging portion 81 of the front polarizing plate 8 is fixed to the upper end surface 41 of the frame 4. Therefore, a light-shielding double sided tape is not required to fix the liquid crystal display panel 10 to the light source 20 (a backlight). The light-shielding double sided tape is a very expensive double sided plate. Accordingly, by eliminating the need for the light-shielding tape and the light-shielding double sided tape, cost reduction can be achieved, such as cost reduction for members and reduction in the number of steps.

The overhanging portion 81 of the front polarizing plate 8 is fixed directly to the upper end surface 41 of the frame 4. Therefore, when a display surface of the liquid crystal display panel 10 is subjected to an impact, the impact is dispersed to the display surface and the frame 4, whereby damage to the liquid crystal display panel 10 can be prevented.

In this preferred embodiment, a driving circuit formed on the TFT substrate 6 is the thin film driving circuit 16. Therefore, the thickness of the liquid crystal display panel 10 can be reduced. Accordingly, the thickness of the frame 4 for accommodating the liquid crystal display panel 10 is reduced, whereby a super thin liquid crystal module can be implemented.

In this preferred embodiment, a part 91 of the FPC 9 is interposed between a double sided tape 14 provided on the bottom of the recess of the frame 4 and the overhanging portion 81 of the front polarizing plate 8. Accordingly, even when the FPC 9 is not handled very well, no stress is applied directly to the thermocompression-bonded portion of the FPC 9 (the terminal portion of the TFT substrate 6). Therefore, defective display resulting from separation of the FPC 9 is less likely to occur. It should be noted that the double sided tape 14 need not necessarily be provided.

The reflection sheet 1 provided on the back surface of the light guide plate 2 has an overhanging portion 11 overhanging from the periphery (four sides) of the light guide plate 2. In other words, the reflection sheet 1 is larger than the light guide plate 2 and overhangs from the four sides of the light guide plate 2. The overhanging portion 11 of the reflection sheet 1 is fixed to a lower end surface 42 of the frame 4. The lower opening of the frame 4 is thus covered by the reflection sheet 1. The overhanging portion 11 of the reflection sheet 1 and the lower end surface 42 of the frame 4 can be bonded together with a double sided tape, glue, or the like. Instead of attaching a double sided tape to the reflection sheet 1, a double sided tape may be attached to a PET (polyethylene terephthalate) tape that covers the reflection sheet 1 in order to fix the reflection sheet 1.

In the liquid crystal display device of this preferred embodiment, the upper opening of the frame 4 is closed by the front polarizing plate 8 and the lower opening of the frame 4 is closed by the reflection sheet 1. The space between the recess formed at the upper end surface 41 of one sidewall of the frame 4 and the overhanging portion 81 of the front polarizing plate 8 is closed by the part 91 of the FPC 9 and the double sided tape 14. The inside of the liquid crystal display device is thus sealed, whereby a path for dirt and dust to enter from outside into the liquid crystal display device can be eliminated. As a result, the possibility that dirt and dust enter the inside during transit of a finished liquid crystal module (liquid crystal display device) and during and after set assembly can be reduced as close to zero as possible. Note that set assembly means mounting a liquid crystal module to a chamber of a cellular phone or the like.

The process of bonding the front polarizing plate 8 to the CF substrate 7 is not particularly limited. For example, the liquid crystal display panel 10 having the FPC 9 thermocompression-bonded to the TFT substrate 6 is first accommodated in the frame 4 and the front polarizing plate 8 is then bonded to the front surface of the CF substrate 7, the upper end surface 41 of the frame 4, and the front surface of the part 91 of the FPC 9. Alternatively, the front polarizing plate 8 is first bonded to the front surface of the CF substrate 7 of the liquid crystal display panel (with the FCP thermocompression-bonded thereto) 10 and the overhanging portion 81 of the front polarizing plate 8 is protected by a laminate or the like. When the liquid crystal display panel 10 is accommodated in the frame 4, the laminate is removed and the overhanging portion 81 is bonded to the upper end surface 41 of the frame 4. The process of bonding the reflection sheet 1 to the light guide plate 2 is not particularly limited.

Although the present invention has been described with reference to preferred embodiments thereof, the technical scope of the present invention is not limited to the range described in the above-described preferred embodiments. It should be understood by those skilled in the art that the above-described preferred embodiments are for illustration only, that various modifications can be made to combinations of the elements and the processing steps described in the preferred embodiments, and that such modifications also fall within the scope of the present invention.

For example, the front polarizing plate 8 closes the upper opening of the frame 4 in the above preferred embodiments. However, a phase difference plate interposed between the front polarizing plate 8 and the CF substrate 7 may close the upper opening of the frame 4. The light source 20 of the above described preferred embodiments is an edge-light type backlight having the LED 12 provided at the end surface of the light guide plate 2. However, the light source 20 may be an area-light type backlight having a multiplicity of LEDs or cold cathode fluorescent lamps provided in a plane. The liquid crystal display device of the above-described preferred embodiments is an active matrix liquid crystal display device using TFTs. However, the present invention is also applicable to an active matrix liquid crystal display device using a two-terminal element such as MIM (Metal Insulator Metal) as a switch element and a passive (multiplex) addressing liquid crystal display device. The present invention is applicable not only to a transmissive-type liquid crystal display device but to a transmissive-reflective type (transflective) liquid crystal display device.

The liquid crystal display device of the present invention can be used in a digital still camera, a cellular phone, a PDA (Personal Digital Assistance), a liquid crystal television, a notebook computer, a display of a personal computer, a display of a car navigation system, an amusement equipment such as game and pachinko, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A liquid crystal display device, comprising at least:
a liquid crystal display panel;
a light source provided on a back side of the liquid crystal display panel;
an input substrate connected to the first substrate arranged to apply a signal from outside to the thin film driving circuit; and
a frame accommodating the liquid crystal display panel and the light source and having an upper opening and a lower opening in an upper portion and a lower portion of the frame, respectively; wherein
the liquid crystal display panel includes a first substrate provided on a side of the light source, a second substrate facing the first substrate, a liquid crystal layer interposed between the first substrate and the second substrate, a thin film driving circuit disposed on the first substrate and arranged to drive the liquid crystal layer, and an optical function sheet provided on a front surface of the second substrate and having an overhanging portion overhanging from a periphery of the second substrate, and the optical function sheet covers the upper opening of the frame and the overhanging portion is fixed to an upper end surface of the frame; and
a portion of the input substrate is interposed between the upper end surface of the frame and the overhanging portion of the optical function sheet.

2. A liquid crystal display device, comprising at least:
a liquid crystal display panel;
a light source provided on a back side of the liquid crystal display panel;
an input substrate connected to the first substrate arranged to apply a signal from outside to the thin film driving circuit; and
a frame accommodating the liquid crystal display panel and the light source and having an upper opening and a lower opening in an upper portion and a lower portion of the frame, respectively; wherein
the liquid crystal display panel includes a first substrate provided on a side of the light source, a second substrate facing the first substrate, a liquid crystal layer interposed between the first substrate and the second substrate, a thin film driving circuit disposed on the first substrate and arranged to drive the liquid crystal layer, and an optical function sheet provided on a front surface of the second substrate and having an overhanging portion overhanging from a periphery of the second substrate, and the optical function sheet covers the upper opening of the frame and the overhanging portion is fixed to an upper end surface of the frame;
the optical function sheet, together with the overhanging portion, is a polarizer arranged to reduce an amount of light that enters the liquid crystal display device through the upper opening of the frame; and
a portion of the input substrate is interposed between the upper end surface of the frame and the overhanging portion of the optical function sheet.

3. The liquid crystal display device according to claim 1, wherein the light source includes a light guide plate arranged to emit light toward the liquid crystal display panel, and a reflection sheet provided on a back surface of the light guide plate and including an overhanging portion overhanging from a periphery of the light guide plate, wherein the reflection sheet covers the lower opening of the frame and the overhanging portion of the reflection sheet is fixed to a lower outside end surface of the frame such that the overhanging portion of the reflection sheet contacts the lower outside end surface of the frame.

* * * * *